Patented Dec. 27, 1932

1,892,399

UNITED STATES PATENT OFFICE

RUSSELL L. JENKINS AND JOSEPH A. SIKARSKI, OF ANNISTON, ALABAMA, ASSIGNORS TO SWANN RESEARCH, INC., A CORPORATION OF ALABAMA

METHOD OF PRODUCING CLEAR TRANSPARENT CHLORINATED DIARYL RESINS

No Drawing. Application filed September 27, 1929. Serial No. 395,741.

This invention relates to a method of making a clear transparent resin and more particularly to a clear, non-crystalline resin of the chlorinated diaryl type.

It is the object of this invention to provide a means whereby a clear, transparent resin may be directly produced from diaryls. A further object of this invention is to provide a clear, transparent resin which will not crystallize.

These objects are accomplished by the use of iodine as a catalyst in chlorinating the diaryl compounds, which catalyst, we have discovered, does not discolor the product as does iron or nickel, and further the diaryls may be so chosen that a clear, non-crystalline product is produced.

The diaryl compounds referred to in this specification have particular relation to diphenyl and other complex diaryl compounds which are obtained in the production of diphenyl. For example when benzol of the grade known as "commercially pure" is vaporized and the vapors raised to a temperature at which they are decomposed, diphenyl and other complex diaryl compounds are formed. The other compounds referred to are similar to diphenyl thus produced but have a higher boiling point so that they can be separated from the diphenyl by fractional distillation. As another example, when benzol of a grade known as "90% commercial" is vaporized, and the vapors raised to a temperature at which they are decomposed, diphenyl and a greater proportion of other complex diaryl compounds are formed. In this case, the other compounds referred to are derivatives of aromatic hydrocarbons, principally toluene and xylene, which constitute a certain percentage of the benzol. These complex diaryl compounds also have a different boiling point from diphenyl and may be separated therefrom by fractional distillation.

Following is a preferred manner by which our invention may be carried out:

Take 60 grams of pure diphenyl and mix therewith 40 grams of the distilled complex, high boiling diaryls obtained as a by-product of the diphenyl formation reaction referred to in the first example above. The complex diaryls used in this case are obtained by distilling off everything boiling below 270° C. from the crude product formed when diphenyl is produced by thermal synthesis. As the residue boiling above 270° C. is distilled, the temperature rises very rapidly to 380° C. and a considerable portion of the residue distills over within substantially the range 380° to 390° C. When the temperature begins again to rise rapidly the distillation is stopped. It is convenient to designate this fraction consisting of complex diaryls boiling above 270° C. and below 400° C. as simply distilled "high boiling compounds".

The above mentioned mixture of 60 grams of diphenyl and 40 grams of high boiling compounds is placed in a glass vessel, heated to melt the ingredients together, .04 gram of iodine is added, and a stream of chlorine gas passed in. As absorption of chlorine proceeds, hydrochloric acid gas is liberated and the reacting mass becomes quite warm due to the heat of the reaction. During the progress of the chlorination, it is desirable to keep the temperature of the mass somewhere near 70° C., increasing to from 175° to 220° C. towards the end of the operation. At intervals it will be necessary to add additional quantities of iodine in, say, .04 gram lots, until approximately 0.4 gram has been added. This is due to the fact that iodine is volatile and is lost with the escaping gases from the reaction mixture. We have found it convenient to test the gases leaving the reacting mass by holding in the gases a strip of filter paper soaked in freshly prepared soluble starch and potassium iodine. A blue coloration of the paper indicates the presence of chlorine escaping from the reacting mass, and either the need of more iodine or a slower flow of gas. The progress of chlorination can be roughly judged by the increase in weight of the sample, or better by means of the softening point of a sample taken from the reacting batch. The softening point is determined by the standard A. S. T. M. method for pitches and is well known to those skilled in the art. It will be understood that an increasing amount of chlorine will increase the temperature of the softening point. If high softening points are desired, it may be necessary to add additional amounts of iodine and pass in additional chlorine.

It will also be recognized that the rate of the reaction and consequently the time necessary for the chlorination to proceed to the desired point will depend upon the temperature of the reacting mass, the amount of iodine added and the time during which and the rate at which chlorine is passed in. In general, it may be said that the higher the temperature, the greater the rate of reaction and also the greater the iodine loss per unit of time. Furthermore, when sufficient iodine is present, the faster the chlorine stream the faster the rate of reaction, except toward the end of the chlorination, when it may be necessary to decrease somewhat the flow of chlorine in order to prevent loss.

Additional variation in the softening point may be obtained by varying the amount of high boiling compound added. We have found that the higher the percentage of high boiling compound in the diphenyl-high boiling compound mixture, the higher the softening point with a particular chlorine content, and vice versa. Furthermore, we have found that the higher the content of high boiling compound in the diphenyl-high boiling compound mixture, the less is the tendency to crystallize when slowly cooled. It is desirable to carry out the chlorination in the absence of metallic iron or nickel, since these metals have been found to discolor the product.

By stopping the chlorination at a point where the material is still liquid, light-colored oils of varying viscosity may be prepared.

Our new product in its solid state may be used as a varnish resin; as a cement in the manufacture of duplex, non-shattering glass; as a substitute for shellac in sealing wax; and as a waterproofing agent where no discoloration is desired. Furthermore, because of the chlorine content it is of considerable flame-retarding value.

What we claim is:

1. Process of producing transparent non-crystalline chlorinated diaryls which comprises melting the compound to be treated and passing chlorine gas into the melted mass in the presence of iodine, and maintaining the temperature of the mass around 70° C. increasing to around 175° C. towards the end of the operation.

2. As a new composition of matter, a chlorinated diaryl composition comprising a chlorinated mixture of diphenyl admixed with other diaryls, which is transparent resinous, non-crystalline and solid at ordinary temperature.

3. Process of producing transparent non-crystalline chlorinated diaryl resins comprising mixing diphenyl with those diaryls other than diphenyl formed during the thermal synthesis of diphenyl from benzol and chlorinating the resulting mixture in the presence of iodine.

4. Process of producing transparent non-crystalline chlorinated diaryl resins comprising chlorinating diphenyl mixed with those diaryls other than diphenyl formed during the thermal synthesis of diphenyl from benzol, said chlorination being carried out in the presence of iodine.

5. Process of producing a transparent non-crystalline chlorinated diaryl resin, comprising chlorinating in the presence of iodine, a mixture comprising 60% by weight of diphenyl and 40% by weight of distilled complex diaryls formed during the thermal synthesis of diphenyl from benzol, said complex diaryls boiling between 270° C. and 400° C.

6. Process of producing a transparent non-crystalline chlorinated diaryl resin comprising chlorinating in the presence of iodine, a mixture of diphenyl and distilled complex diaryls formed during the thermal synthesis of diphenyl from benzol, said complex diaryls boiling above 270° C. and below 400° C.

In testimony whereof we affix our signatures.

RUSSELL L. JENKINS.
JOSEPH A. SIKARSKI.